Patented Dec. 11, 1945

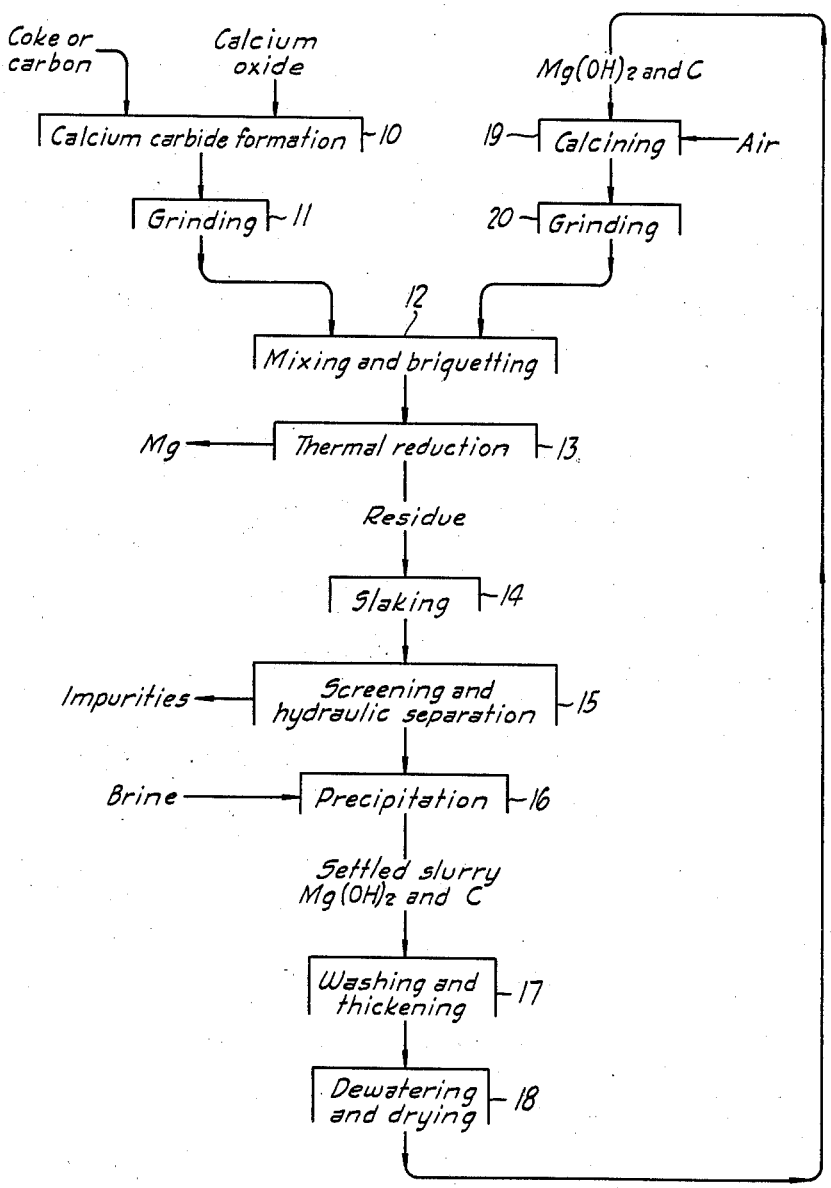

2,390,531

UNITED STATES PATENT OFFICE 2,390,531

PROCESS OF MANUFACTURING METALLIC MAGNESIUM

Fritz J. Hansgirg, San Mateo, Calif., assignor to Marine Magnesium Products Corporation, South San Francisco, Calif., a corporation of Delaware Application June 14, 1941, Serial No. 398,124

4 Claims. (Cl. 75—67)

This invention relates generally to the manufacture of metallic magnesium by the thermal reduction of magnesium compounds, particularly magnesium oxide. More particularly, it relates to processes making use of thermic reduction of magnesium oxide with calcium carbide.

The use of calcium carbide for the reduction of magnesium oxide has been proposed many years ago, but the method has not become a factor in the production of metallic magnesium in large scale operation. Calcium carbide is ordinarily a relatively expensive reducing agent. In the past the reduction of MgO with the calcium carbide has resulted in a residue consisting of calcium oxide and carbon, together with varying amounts of unreacted magnesium oxide and calcium carbide. No satisfactory and practical commercial method has been developed for the utilization of this residue. The equation for the reaction of magnesium oxide with calcium carbide is as follows:

$$MgO+CaC_2=CaO+2C$$

In a typical instance where only 70 to 75% of the starting materials have reacted, the yield of metallic magnesium calculated on the weight of the original starting materials is relatively low.

To utilize the residue, it has been proposed to add additional carbon or coke and utilize the mixture for the manufacture of additional calcium carbide for use in the process. The difficulty with such a method is that unreacted magnesium oxide, when present in the residue to a considerable extent, interferes with proper operation of a carbide furnace, particularly in that the carbide becomes viscous and cannot be readily tapped from the furnace. Also the presence of magnesium oxide in the calcium carbide furnace causes excessive and wasteful power consumption.

In a typical instance the residue resulting from the reaction of normal dead burned magnesite with normal commercial calcium carbide may be as follows:

| | |
|---|---|
| CaO | 56 |
| MgO | 10 |
| SiO$_2$ | 3 |
| Al$_2$O$_3$ | 3 |
| C | 20 |
| CaC$_2$ 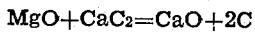 | 7 |

It will be evident that if the above residue is wasted, then about 25% of the magnesium oxide entering the process is wasted, in addition to all of the calcium oxide and carbon produced as a result of the reaction.

According to the process of the present invention, a new and useful combination is employed wherein the lime introduced into the process has a double function. Also, in the present process the carbon in the residue from the reaction is utilized as a fuel for a calcining operation.

In the past various processes have been developed and are in commercial use for the precipitation of magnesium hydroxide from sea water, salt bitterns, or brines containing convertible magnesium salts. Under favorable conditions for the cost of power and lime, such processes are capable of producing magnesium hydroxide and magnesium oxide at a cost less than magnesium oxide can be produced from the calcining of minerals such as magnesite.

The present invention makes use of magnesium oxide produced from such precipitated magnesium hydroxide, and in addition it utilizes the residue from a thermal reducing operation, as a precipitating agent. By utilizing this residue for the precipitation of magnesium hydroxide from sea water or other brine, for further use in the process, it is possible to lower the cost of producing the metallic magnesium to a considerable amount. Therefore by the utilization of such a combined process, the reduction of magnesium oxide with calcium carbide becomes economically feasible for large scale production of magnesium metal. I have found that this residue will form a precipitate having a settling rate considerably greater than one obtained with an ordinary commercial lime.

To facilitate explanation of my process, the following equations are given:

1. $CaO+3C=CaC_2+CO$
2. $MgO+CaC_2=Mg+CaO+2C$
3. $CaO+2C+H_2O=Ca(OH)_2+2C$
4. $Ca(OH)_2+2C+MgCl_2=Mg(OH)_2+2C+CaCl_2$
5. $Mg(OH)_2+2C+Air=2CO_2+H_2O+MgO$

Equation 1 represents the normal formation of calcium carbide from lime and coke in the electric furnace.

Equation 2 represents theoretical 100% reduction of magnesium oxide with calcium carbide produced according to the Equation 1. Assuming that the ingredients are intermixed in theoretical stoichiometrical proportions, the reaction will not in practice be 100% complete, but will result in amounts of unreacted magnesium oxide and calcium carbide varying in quantity in accordance with the efficiency of the reaction. One can employ either stoichiometrical proportions or a slight excess of magnesium oxide over the stoichiometric ratio, as for example an excess of 0.2 mol. in order to somewhat reduce the amount of unreacted calcium carbide in the residue. The increased amount of magnesium oxide in the residue resulting from such procedure is no waste in the process as it is later recovered and reintroduced.

Equation 3 shows the hydration of the residue from the thermal reduction operation, to form a slurry for reaction with the sea water or other brine. During such hydration of the residue, unreacted calcium carbide is converted to calcium hydroxide and carbon. Also, unreacted magnesium oxide of the residue is converted to magnesium hydroxide.

Equation 4 gives the reaction of a convertible magnesium salt, such as magnesium chloride or equivalent magnesium sulfate, in sea water or other brine, for the precipitation of magnesium hydroxide. The magnesium hydroxide content of the slurry and also the divided carbon merge with the precipitated magnesium hydroxide.

Equation 5 represents the reaction which takes place in calcining the precipitate. The carbon contained in the precipitate is utilized as a fuel and produces the necessary heat for the calcining operation.

The accompanying flow sheet illustrates one procedure for carrying out the process. Operation 10 represents formation of calcium carbide from coke and calcium oxide in a suitable carbide furnace. This carbide is then subjected to grinding 11, after which it is mixed and briquetted with magnesium oxide at 12. These briquets are then charged in a suitable retort for carrying out the thermal reduction operation 13. The residue of this reaction, consisting of calcium oxide, carbon, and varying amounts of unreacted magnesium oxide and calcium carbide, is subjected to slaking in 14, whereby any unreacted calcium carbide is reacted with water to form calcium hydroxide and acetylene gas, and whereby the calcium oxide content is converted to calcium hydroxide. Also, unreacted magnesium oxide of the residue is hydrated to form magnesium hydroxide. The slurry from this slaking operation is then preferably subjected to screening and hydraulic separation at 15, for the purpose of removing oversize impurities, and heavier impurities such as calcium silicate, which should not be permitted to build up in the process. The purified slurry is then reacted with a brine containing convertible magnesium salts such as sea water, in the precipitating operation 16.

In place of slaking and treating the residue as described above, it is possible to directly intermix the residue with the brine to react the calcium oxide content with the convertible magnesium salts.

After reacting the calcium hydroxide content of the slurry with the brine, the precipitated material, together with the magnesium hydroxide or oxide content of the slaked slurry and the carbon content, is permitted to settle from the mother liquor and withdrawn as a settled slurry. This slurry is then subjected to washing and thickening operations 17, for the purpose of producing a thickened slurry which is to be subsequently further dewatered to form a dry material for calcining. Dewatering is indicated at 18 and can be carried out by conventional filtration and drying. The dry material is then supplied to the calcining operation 19, which can be carried out with known types of equipment, and in which it is desirable to burn the carbon content to supply the necessary heat required. As an alternative method to utilizing conventional calcining equipment, such as a rotary kiln, the dried material can be suspended in an air stream and blown through a nozzle into a combustion chamber, where the carbon is burned to produce the necessary heat for calcining. In a typical instance the amount of heat obtained by burning the carbon of the residue will be ample for the calcining operation 19, although if desired additional heat can be supplied. The calcined material consisting of magnesium oxide is then supplied to the grinding operation 20, and the ground material supplied to the mixing and briquetting operation 12.

In grinding the calcium carbide and the magnesium oxide in the operations 11 and 20, it is preferable to reduce the material to relatively small particle size, as for example 90% minus 200 mesh. It has been found difficult to carry out grinding simultaneously with intermixing, and for this reason the grinding is carried out separately, followed by intermixing of the ingredients, and pressing of the ingredients into briquets. It has been found that no binder is required for the briquetting operation, since the finely ground ingredients tend to form masses of considerable inherent strength.

Equipment suitable for carrying out the thermal reduction operation 13 is shown in the art, and can consist of a gas tight retort into which the briquets are charged, and which is heated by a suitable furnace. In conjunction with the retort, provision is made for collecting the evolved metal, such as a cooler end portion in which the released magnesium vapor condenses to a crystalline crust of metallic magnesium. By application of a vacuum during the reaction, as for example a vacuum of the order of 0.2 to 10 mm. of mercury, the reaction can be carried out at temperatures of the order of from 1050 to 1200° C. In typical instances, the time period of the reaction will vary from, say, 6 to 10 hours.

As an example of actual practice, one can proceed as follows: 50 parts by weight of magnesium oxide containing 98% MgO is intimately mixed with 76 parts of calcium carbide containing 84% $CaC_2$, and the mixture compressed into briquets. These briquets are then placed in the retort and heated to a temperature of from 1050 to 1200° C. for a period of from 6 to 10 hours, under application of a high vacuum such as 1 mm. of mercury. The magnesium metal evaporates from the briquets and condenses to a crystalline crust of solid and relatively pure metal. This metal can be removed after cooling the retort and releasing the vacuum, and can be cast into ingots in the usual way. The residue containing 102 parts of a mixture of calcium oxide, carbon, and unreacted magnesium oxide and calcium carbide, is treated as previously described to form a slaked slurry, which is then reacted with 37,000 parts of sea water. The resulting precipitate after being washed contains about 72 parts of magnesium hydroxide and 24 parts of carbon. The calcining of this mixture, in the manner described, yields about 52 parts magnesium oxide, 50 parts of which are employed to mix with calcium carbide for further use in the process. The amount of this excess is dependent somewhat upon the efficiency of the thermal reaction. The 76 parts of calcium carbide are prepared from 75 parts of lime and 50 parts of coke. Therefore, from 75 parts of lime, 50 parts of coke, and 37,000 parts of water, about 24 parts of metallic magnesium can be produced.

This application is a continuation in part of my application Serial No. 357,199, filed September 18, 1940, for Process of manufacturing metallic magnesium.

I claim:

1. In a process for the production of metallic magnesium, the steps of reacting calcium carbide with magnesium oxide at an elevated temperature to effect release of metallic magnesium, leaving a reaction residue including lime, precipitating magnesium hydroxide from a brine containing convertible magnesium salts by reaction of said brine with said lime, converting the precipitated magnesium hydroxide to magnesium oxide, and then utilizing the magnesium oxide for reaction with further calcium carbide as the process proceeds.

2. In a process for the production of metallic magnesium, the steps of reacting calcium carbide with magnesium oxide at an elevated temperature to release metallic magnesium, leaving a reaction residue including lime and carbon, introducing the mixture of lime and carbon into a brine containing convertible magnesium salts whereby the magnesium hydroxide is precipitated, removing the magnesium hydroxide slurry together with the carbon of the residue from the brine, calcining the removed material whereby the carbon content of the same is burned and whereby the magnesium hydroxide is converted to magnesium oxide, and then utilizing the magnesium oxide for reaction with further calcium carbide as the process proceeds.

3. In a process for the production of metallic magnesium, the steps of reacting calcium carbide with an excess of magnesium oxide over the stoichiometric ratio at an elevated temperature to release metallic magnesium, leaving a reaction residue including unreacted magnesium oxide, lime and carbon, introducing the mixture of unreacted magnesium oxide, lime and carbon into a brine containing convertible magnesium salts whereby the magnesium hydroxide is precipitated, removing the magnesium hydroxide slurry together with the excess magnesium oxide and carbon of the residue from the brine, calcining the removed material whereby the carbon content of the same is burned and whereby the magnesium hydroxide is converted to magnesium oxide and then utilizing the excess magnesium oxide together with the newly formed magnesium oxide for reaction with further calcium carbide as the process proceeds.

4. In a process of the character described, the steps of reacting calcium carbide with magnesium oxide at an elevated temperature to effect release of metallic magnesium, leaving a reaction residue containing lime and carbon, reacting the residue with a brine containing convertible magnesium salts whereby magnesium hydroxide is precipitated, removing the precipitated magnesium hydroxide and the carbon of the residue from the brine, and then burning the carbon of the residue to convert the magnesium hydroxide to magnesium oxide.

FRITZ J. HANSGIRG.